US 7,013,949 B2

(12) United States Patent
Cervantes et al.

(10) Patent No.: US 7,013,949 B2
(45) Date of Patent: Mar. 21, 2006

(54) METAL FLOW CONTROL

(75) Inventors: Michel Cervantes, Luleå (SE); Mats Jalk, Nyköping (SE); Håkan Kelvesjö, Borlänge (SE); Willy Ohlsson, Nyköping (SE)

(73) Assignee: MPC Metal Process Controll AB, Nykoping (SE)

( * ) Notice: Subject to any disclaimer, the term of this patent is extended or adjusted under 35 U.S.C. 154(b) by 237 days.

(21) Appl. No.: 10/415,741

(22) PCT Filed: Oct. 26, 2001

(86) PCT No.: PCT/SE01/02351

§ 371 (c)(1),
(2), (4) Date: May 2, 2003

(87) PCT Pub. No.: WO02/36293

PCT Pub. Date: May 10, 2002

(65) Prior Publication Data

US 2004/0026064 A1 Feb. 12, 2004

(30) Foreign Application Priority Data

Nov. 3, 2000 (SE) .................................... 004072

(51) Int. Cl.
*B22D 11/18* (2006.01)
(52) U.S. Cl. ..................... 164/453; 164/488; 164/437; 164/155.1

(58) Field of Classification Search ........ 164/488–490, 164/437–440, 453, 155.1
See application file for complete search history.

(56) References Cited

U.S. PATENT DOCUMENTS

| 4,868,856 | A | | 9/1989 | Frith et al. | |
|---|---|---|---|---|---|
| 5,325,724 | A | | 7/1994 | Kiene et al. | |
| 6,566,853 | B1 | * | 5/2003 | Li et al. | ............ 324/71.4 |
| 6,660,220 | B1 | * | 12/2003 | Forman | ............ 266/45 |

FOREIGN PATENT DOCUMENTS

| EP | 0265206 | 4/1988 |
|---|---|---|
| EP | 0371482 | 6/1990 |
| JP | 05-077018 | 3/1993 |

* cited by examiner

*Primary Examiner*—Kuang Y. Lin
(74) *Attorney, Agent, or Firm*—Harness, Dickey & Pierce, P.L.C.

(57) ABSTRACT

A method and a system are for the control of a gas-containing hidden flow of molten metal in a space defined by a tubular device. From measurements in at least one predetermined layer of the metal flow in the space, an indication is obtained of the appearance of the flow which is compared with stored values. The result of the comparison is used for controlling at least one flow-affecting parameter in such a manner that a desired type of flow is provided at least in the layer.

45 Claims, 4 Drawing Sheets

METAL FLOW CONTROL

This application is the national phase under 35 U.S.C. § 371 of PCT International Application No. PCT/SE01/02351 which has an International filing date of Oct. 26, 2001, which designated the United States of America, and which claims priority on Swedish Patent Application No. 0004072-5 filed Nov. 3, 2000, the entire contents of which are hereby incorporated by reference.

FIELD OF THE INVENTION

The present invention generally relates to a method and a system for the control of a flow of metal. More preferably, it relates to the control of a flow of molten metal in a space defined by a tubular device, such as a pipe and/or, in particular, a pouring nozzle or a submerged entry nozzle.

BACKGROUND OF THE INVENTION

In the metallurgical industry there are different processes in which liquid metal is to be processed in one way or another. One example is the casting of metal, such as steel. In part of such a casting process, the liquid metal is supplied from a ladle via a pouring nozzle to a tundish. The metal flows from the tundish via a pouring nozzle to a casting mould or chill mould, in which the metal is cooled and transformed into solid form.

The supply and the flow of the metal through the pouring nozzle is very important in order to produce a configuration of flow in the chill mould that gives optimal conditions as regards the solidification of the metal and as regards the use of additives, such as casting powder or lubricant.

Moreover, it is important to prevent solid material, such as aluminium oxides, from accumulating on the inside of the pouring nozzle and in its outlet openings. Such solid material can, on the one hand, cause clogging of the pouring nozzle and the openings and, on the other, affect the flow and thus the casting process and the quality of the end product.

By way of today's technique, it is a problem to ensure that a metal flow which is located in the pouring nozzle is favorable for the casting process, since the metal is hidden or not visible as it flows through the pouring nozzle. Attempts are made to estimate what the flow looks like inside the pouring nozzle by, for instance, water modelling or mathematical modelling. However, these methods mostly take stationary conditions into account. In reality, marked variations can arise in the flow due to, for example, interference from a flow-controlling unit, such as a stopper or sliding gate, asymmetry in the flow, a varying level in the tundish and clogging of the nozzle.

Usually some form of gas, such as argon, is injected into the pouring nozzle in order to prevent clogging. However, this results in a secondary effect, implying that the flow then can change.

SUMMARY OF THE INVENTION

An object of an embodiment of the present invention is to provide a method and a system for the control of the metal flow through a defined space, which will obviate the problems mentioned above.

The above-mentioned object may be achieved according to an embodiment of the invention, by a method and a system.

According to one aspect of the invention, a method is thus provided for controlling a gas-containing flow of molten metal in a space defined by a tubular device, which may therefore be hidden or not visible, for example, preferably inside a pouring nozzle or a submerged entry nozzle. The method comprises the steps of measuring, for at least one predetermined layer of the metal flow in the space, at least one quantity which is representative of at least one flow factor in said layer, obtaining values from the measured quantity, that give an indication of the appearance of the flow in said layer by comparing with stored, preferably empirically determined values, and controlling based on the result of the comparison at least one flow-affecting parameter, such as gas supply and/or metal supply, so that a desired type of flow is produced at least in said layer.

According to another aspect of the invention, a system is provided for controlling a gas-containing hidden or not visible flow of molten metal in a space defined by a tubular device, preferably inside a pouring nozzle. The system comprises a detection device which is intended to be arranged at the tubular device in order to measure, at least for a predetermined layer in the space, at least one quantity which is representative of at least one flow factor in said layer. An evaluation device is connected to the detection device for receiving values which have been obtained from the measured quantity and which give an indication of the appearance of the flow in said layer, the evaluation device comparing these received values with stored, preferably empirically determined, values. A control device is connected to the evaluation device and is adapted to control from the result of the comparison at least one flow-affecting parameter, such as gas supply or metal supply, so that said desired type of flow is provided in at least said layer.

In this patent application, the flow factor shows itself in components active in the defined space, such as metal contents, gas contents, etc, which each separately or jointly form one or more flow states in the space.

At least one embodiment of the invention is thus based on the understanding that knowledge of the material contents, i.e. the distribution of materials in the form of metal and gas, in selected parts of the space, can give information about the actual type of flow therein. By measuring a quantity which is representative of a flow factor, such as the metal contents, an indication is obtained of the distribution of metal and gas in the space. The indication of the distribution of metal and gas, i.e. the appearance of the flow, is advantageously obtained by calculation or determination of an indication value which is based on the performed measurements and which is compared with stored, calculated or empirically determined values.

In this patent application, type of flow refers to a predetermined, identified appearance, i.e. a predetermined distribution of gas and metal, in at least some part of a flow. By determining the gas contents or the gas composition in a predetermined portion of the defined space, it is possible to determine what type of flow is involved in this portion. Subsequently, the supply of liquid metal and/or, for example, gas to the defined space can be controlled in order to modify the configuration of flow in this portion. Consequently, this results in a great difference compared with prior-art technique, in which it is necessary to perform rough estimations and in which certain changed conditions can change the configuration of flow considerably without being discovered directly.

Thus, one advantage of at least one embodiment of the present invention is that it can continuously take changes into account and control flow-affecting parameters accordingly. For example, a beginning clogging can be discovered at an early stage and be quickly counteracted before the interference has become too large.

According to a further aspect of the invention, a flow-controlling system as stated above is used for detecting if inclusions/slag which are/is entrained by the metal accumulate/s on or clog/s a pouring nozzle, and for taking measures that counteract such accumulation of deposit/clogging.

Another advantage of at least one embodiment of the present invention is that a direct procedure is used by measuring on the actual flow unlike prior-art technique where an indirect procedure in the form of modelling is used.

Essentially three types of flow and combinations thereof as regards liquid metal in a pouring nozzle have been identified, in the cases when liquid metal flows through the nozzle and non-metallic material, such as gas, also is present. These three types of flow are: 1) bubbly flow, 2) annular centred flow and 3) annular non-centred flow. In a bubbly flow, supplied gas is diffused or distributed in the metal. An annular centred flow essentially appears in the form of a continuous metal jet surrounded by gas. The contrary applies to an annular non-centred flow where the metal flow essentially follows the walls of the nozzle and a gas is located at the centre axis of the nozzle. It may be desirable as regards a predetermined type of flow in a predetermined part of the nozzle. It has among other things turned out to be advantageous to have a bubbly flow in the lower part of the pouring nozzle since this is an essentially constant flow into the chill mould, which favours the casting process.

An advantageous way of measuring the actual type of flow is to measure on a number of layers or sections in the transverse direction of the defined space in order to learn what the distribution of material looks like in these layers. Consequently, it is a question of a type of tomography. By way of the measurement information obtained for the respective layers, it is possible to provide a picture of the flow in selected portions of the defined space and thus determine the actual type of flow for the respective portions. It should be understood that a layer can be both transverse to the tubular device, i.e. a horizontal layer, and longitudinal, i.e. a vertical layer. A further alternative is diagonal layers through the tubular device.

At least one embodiment of the invention is extremely useful in casting processes, in which liquid metal is supplied from a tundish to a pouring nozzle for teeming into a chill mould. The pouring nozzle in such processes hides the metal flow therein. The absence of insight and the lack of satisfactory possibilities of monitoring are therefore compensated for by at least one embodiment of the present invention which gives information about the distribution of materials in a layer of the flow in the pouring nozzle.

As already mentioned, a desired type of flow is produced by control of at least one flow-affecting parameter. In this patent application, flow-affecting parameters relate to such parameters that can affect the type of flow and therefore should not be limited to flow in the sense of volume per unit of time, but should relate to the appearance of the flow as such. For example, gas can be supplied in a predetermined manner so that the appearance of the flow or the type of flow is changed without the quantity of metal flowing through the space per unit of time being changed. In addition to controlling the gas supply, controlling the metal supply is an alternative method of changing or maintaining a predetermined type of flow.

The type of flow can thus be affected by changed supply of metal to the defined space. Consequently, the direction in which or the angle at which the liquid metal is supplied can be changed. Alternatively, a larger or smaller volume of metal per unit of time can be supplied by using a flow-controlling or flow-affecting unit of a suitable type. In casting a vertically adjustable stopper is a possible flow-controlling unit. When the stopper is lowered it tightens the inlet of the tubular device, i.e. a pouring nozzle, whereby metal is prevented from flowing from a container, such as a ladle or a tundish, to the pouring nozzle. However, when the stopper is elevated, the metal is allowed to flow to the pouring nozzle, the volume being dependent on the vertical position of the stopper.

Another possible flow-controlling unit is a sliding gate, which comprises apertured plates that are arranged on one another, and are displaced or rotated relative to one another. Thus, when an aperture in an upper plate at least partly overlaps an aperture in a lower plate, a metal flow is allowed through these to the pouring nozzle (the larger the overlapping, the larger the metal flow). Those skilled in the art will realise that also other corresponding flow-controlling units are possible and that these units can control quantity as well as direction of inflow. The metal flow can also be affected for example by the quantity of liquid metal in the tundish and the speed at which new metal is supplied to the tundish being controlled.

In addition, types of flow can be affected by the supply of gas to the defined space being changed. The quantity of gas which is supplied is variable, as well as the pressure at which the supply is provided. Also position and direction are factors which are important, i.e. from where the gas is supplied and, for example, at what angle to the main flow or to the walls that limit the defined space. Advantageously, the gas is supplied via a gas pipe which extends through the above-described stopper which thus also functions as nozzle. The gas can also be injected from an attaching device which is used for attaching a pouring nozzle to a tundish. Alternatively, the tundish or the pouring nozzle in itself can be provided with gas inlets at different angles. Examples of gases which can be used are inert gases, such as argon, etc.

One characteristic of at least one embodiment of the invention is that the measurement and the determination of the actual type of flow occur without contact relative to the gas and metal flow. The measurement is performed from at least one side of the defined space, such as from one side of a pipe that defines the space. However, there are many possible configurations, some of which will be described below.

In order to measure a quantity which is representative of the metal and gas contents in the space, for example electromagnetic methods of measurement can be used, in which the quantity such as an induced voltage is preferably related to the strength of the magnetic field. Another alternative is acoustical measurements, such as the use of ultrasound. Yet another alternative is vibration measurements. Further alternatives are different forms of radiation measurements, such as X-ray or gamma measurements. Other alternatives are temperature measurements or pressure measurements. A further alternative is speed measurements of the metal and gas flow. Those skilled in the art will realise that a combination of the methods of measurement indicated above also is an alternative.

The detection device which is adapted to give information about the current configuration of flow or the type of flow and which is used in at least one embodiment of the present invention preferably comprises one or more sensors. The sensors for use in connection with the measurements can be arranged in such a manner that they surround the metal flow completely or partly. The sensors can be arranged in a plane transversely to the main direction of flow of the liquid metal. Besides, the sensors can be arranged along the main direction of flow of the metal, i.e. in several planes. This is advantageous if it is desirable to detect and control different types of flow in different parts of the defined space. By measurements being performed continuously, data is obtained for such controlling. For example, when it comes to casting it may be important to know where the transition zone between centred flow and bubbly flow is located in a pouring nozzle, so that it can be ensured that there is enough time for the flow to become a proper bubbly flow before the metal flows out into a chill mould.

A method of measurement which has been found to be especially advantageous comprises the use of a sensor arrangement having coils which generate electromagnetic fields and which have been arranged round the defined space, in which the metal flows. The arrangement suitably comprises one or more combinations of transmitting coils and receiving coils. Advantageously, each coil is arranged next to or enclosing the tubular device. One or more transmitters can operate with one or more receivers. The coils can each operate with one or more frequencies. Thus, at least one first transmitting coil can generate an electromagnetic field having a first frequency to which at least a first receiving coil is tuned, while at least one second transmitting coil generates a field having a second frequency to which at least a second receiving coil is tuned. This facilitates the separation of differently placed sets of coils. The coils are preferably arranged in such a manner that ambient interference is minimised by some coils being reverse coupled and, thus, the basic signal which may contain interference is eliminated. Consequently, essentially only the signal is measured, which has been affected by the physical phenomenon to be measured.

One basic arrangement is to have a transmitting coil and two receiving coils, the receiving coils being placed in such a manner that one of them is not essentially affected by the development in the test object, whereas the other is placed so that it is at least partly affected by events taking place in the test object. Since the receiving coils are reverse coupled or balanced in a state where no influence from the test object occurs, a zero signal or a minimum signal is obtained, which serves as a basis from which measurements of the changes taking place in the test object are detected with a low degree of noise. In order to avoid the risk of phase transitions between the receiving coils when changes take place in the test object, the reverse coupling is suitably made in such a manner that a small signal on one side of the balance point is obtained.

At least one embodiment of the invention is thus suited for use in connection with metal flow control through pouring nozzles. In a basic configuration, a transmitting coil is thus arranged on one side of the pouring nozzle for generating an electromagnetic field. A first receiving coil is arranged on the other side of the pouring nozzle so that this is screened by the contents in the pouring nozzle. The pouring nozzle in itself does not essentially affect the electromagnetic field since the pouring nozzle usually is made of a ceramic material. A second receiving coil is arranged in such a manner that it is not at all screened by the contents of the pouring nozzle. The difference in strength between the electromagnetic fields detected by the two receiving coils is calculated in order to determine a value which indicates the actual type of flow. It has been found that a distinct signal is already achieved by way of the above-described basic configuration, so that a satisfactory indication of the appearance of the flow is obtained. However, more coils can be added to this configuration. Consequently, the coils can be arranged in different positions round the pouring nozzle and in combinations of one or more transmitting coils with one or more receiving coils, whereby more extensive information about the configuration of flow in the pouring nozzle is obtained.

As an alternative to the stationarily arranged coils, one possibility is to use movable coils. For example, a stationary transmitting coil is used which is arranged on one side of the tubular device and a receiving coil which is screened by the metal flow and is scanned or swept along a section of a circular path. Those skilled in the art will realise that also the contrary is possible, i.e. a scanning transmitting coil and a stationary receiving coil. Yet another possibility is that both the transmitting coil and the receiving coil are scanned. The receiving coil can, as in the above-mentioned technique, be reverse coupled to a receiving coil that is not screened.

In order to calibrate the measuring equipment, zero calibration and full flow calibration, i.e. with only air and only metal, respectively, in the defined space, are suitably performed. Moreover, calibration is carried out with respect to the three typical types of mixed flow. This calibration can be performed in a cold state by using a metal rod which is inserted into the space and thus represents an annular centred flow. In a corresponding way, a metal pipe can be inserted into the space in order to obtain representation of an annular non-centred flow. In the case of a bubbly flow, it is possible to use a metal body having non-metallic inclusions which correspond to an expected non-metallic state, such as a state of gas. This can be provided by way of a metal or a metal alloy, such as Wood's metal, and non-metallic balls cast therein, such as glass spheres.

When measuring on a metal flow in a tubular device, it is thus possible to obtain an indication of the appearance of the flow, i.e. the diffusion or the composition of gas and metal, by comparing with stored values which advantageously are determined empirically as stated above. An alternative is to use values of different types of flow determined by calculations.

An evaluation device is connected to the detection device. This evaluation device is adapted to receive signals from, for example, sensors comprised in the detection device, the actual type of flow being determined based on the received signals. The evaluation device preferably comprises suitable conventional electronics, hardware and software.

The evaluation device sends information about the actual type of flow to a connected control device. A user can feed the desired type of flow to the control device. Thus, a comparison can be made continuously between the actual and the desired type of flow. If the types of flow differ, the control device can control at least one flow-affecting, i.e. flow-type affecting, parameter. The control device can, for example, send signals to valve devices or the like. The control device preferably comprises suitable conventional electronics, hardware and software.

Since at least one embodiment of the present invention relates to a method and a system for the control of a gas-containing a metal flow, such as a hidden or not visible flow, for example, this does not prevent at least one embodiment of the invention from being used when the gas supply takes place passively. Unlike an active supply of gas when the operator himself chooses to inject gas into the metal flow, it is common in, inter alia, pouring nozzle couplings that air or other gases from the surroundings passively leaks into the metal flow. If an undesired flow arises in, for instance, such a leakage, this is controlled according to at least one embodiment of the invention by flow-affecting parameters, such as by an active supply of gas and metal so that the desired type of flow is obtained.

DETAILED DESCRIPTION OF THE PREFERRED EMBODIMENTS

Figure 1:
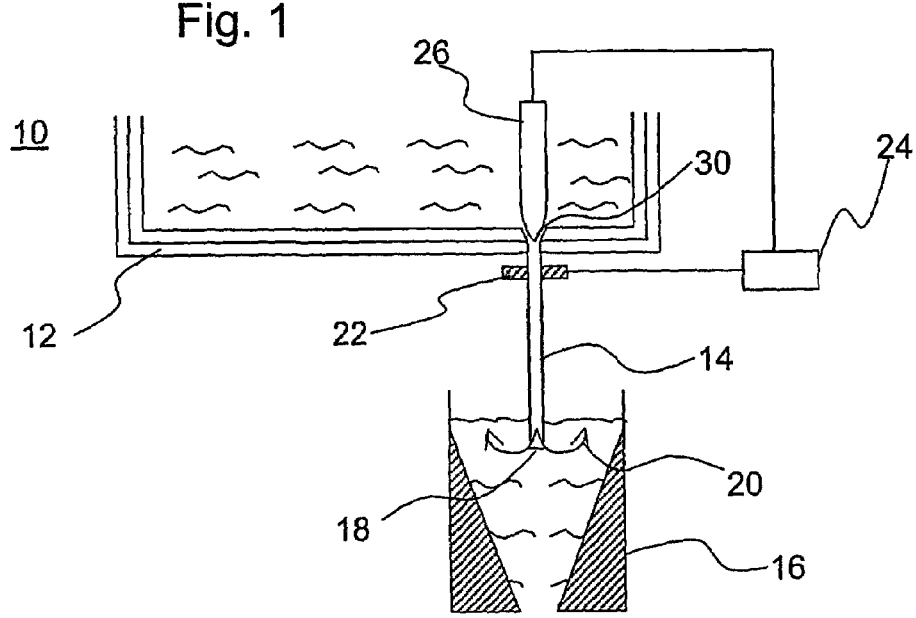
FIG. 1 schematically shows parts of a casting plant, one embodiment of the present invention being used.

FIG. 1 schematically shows parts of a casting plant 10, in which the present invention is used. A tundish 12 of the casting plant 10 is shown which contains liquid metal, such as liquid steel. A vertical pouring nozzle 14 is arranged in the bottom of the tundish 12, through which pouring nozzle the liquid metal can flow down to a chill mould 16. The pouring nozzle 14 is lowered into or submerged in the chill mould 16 and the lower end of the pouring nozzle 14 is located under the surface of liquid metal. In addition, the lower end of the pouring nozzle 14 is provided with outlet holes in the form of side openings, whereas its end surface 18 is closed. The side openings are adapted to produce a symmetric flow in the chill mould as the arrows 20 schematically illustrate.

A detection device 22 which is included in the system according to the invention is arranged round the upper portion of the pouring nozzle 14. The detection device 22 is connected to receiving peripheral equipment 24 which can comprise an evaluation device and a control device. Based on the information received by the detection device 22, the peripheral equipment 24 determines if the actual type of flow is acceptable or if a flow-affecting measure has to be taken. It may, for example, be desirable to detect any incipient clogging of the pouring nozzle 14, in which case the type of flow changes. If such a change occurs, a flow-affecting measure is thus taken by the peripheral equipment 24 sending signals to a flow-affecting device which in the Figure is illustrated by a stopper 26 functioning in a known manner.

The stopper 26 can, in a lowered position, be made to seal the inlet 30 of the pouring nozzle 14, thereby preventing the metal flow from flowing into the pouring nozzle 14. The stopper 26 can in various elevated positions allow the supply of metal in different quantities. A gas conduit (not shown) having a gas outlet is suitably arranged in the stopper so that gas can be supplied to the metal flow, preferably independently of the vertical position of the stopper 26.

Figure 2:
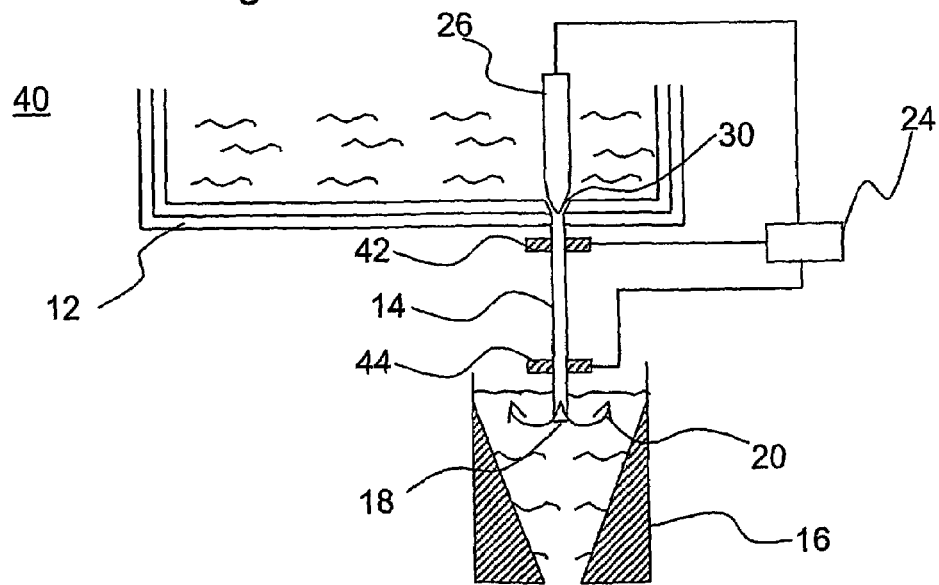
FIG. 2 shows as FIG. 1 parts of a casting plant, an alternative embodiment of the present invention being used.

FIG. 2 shows parts of a casting plant 40, in which an alternative embodiment of the present invention is used. The parts included in this casting plant 40 have been given the same reference numerals as equivalent parts in FIG. 1. Unlike the detection device 22 in FIG. 1 which was arranged only round the upper portion of the pouring nozzle, the detection device according to the embodiment shown in FIG. 2 comprises a detection device which are arranged at several locations along the pouring nozzle. First detection devices 42 are thus arranged around the upper portion of the pouring nozzle 14 and second detection devices 44 around the lower portion of the pouring nozzle 14. For reasons of clarity, only these two sets of detection devices are illustrated. However, those skilled in the art realise that it is possible to arrange more detection devices along the pouring nozzle.

As the detection device 22 in FIG. 1, the detection devices 42, 44 are connected to receiving peripheral equipment 24 which communicates with a flow-affecting device 26. Information about the type of flow can thus be obtained at two locations along the pouring nozzle 14 by way of the embodiment shown in FIG. 2. For example, this is advantageous when it is desirable to ensure that the type of flow changes along the pouring nozzle 14. It may be desirable to have an annular centred flow in the upper portion of the pouring nozzle, the gas which flows along the walls protecting the pouring nozzle from, among other things, clogging. On the other hand, in order to obtain an even flow in the chill mould 16, it may be desirable to have a bubbly flow in the lower portion of the pouring nozzle 14. The shown double set of detection devices can also be used for ensuring that the type of flow is the same along the pouring nozzle 14, if desirable.

FIGS. 3a–3f show various alternative configurations as regards electromagnetic detection which has been found to be advantageous when controlling a metal flow in an elongated space, such as a pouring nozzle. FIGS. 3a–3f show a transmitting coil as a box filled in with stripes and a receiving coil as a blank box. The dashed lines in these figures are only intended for illustrating with which receiving coil or receiving coils located at a distance the respective transmitting coils communicate and, as a matter of fact, do not illustrate the propagation of the actual electromagnetic fields, which would make the figures indistinct.

Figure 3:
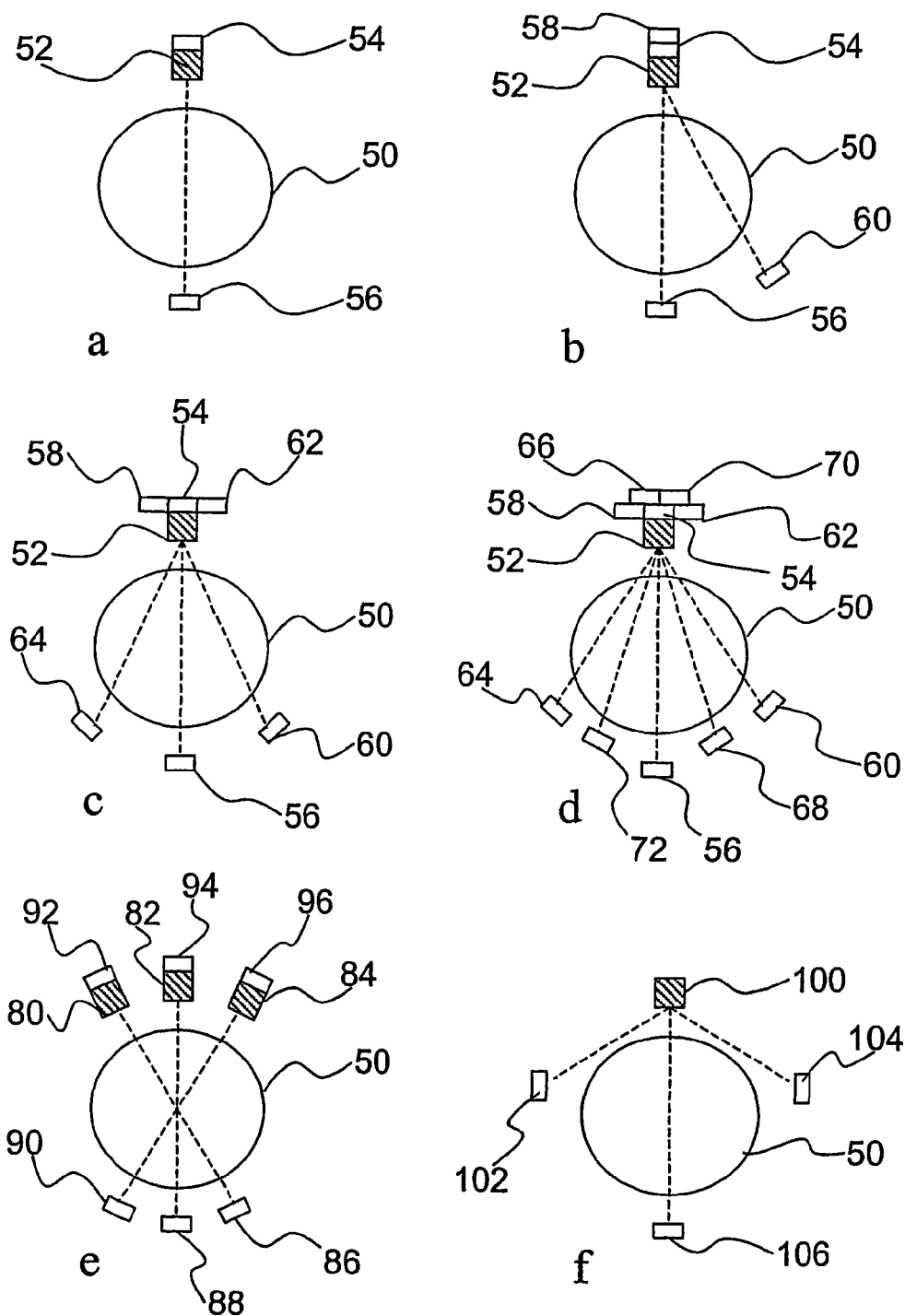
FIGS. 3a–3f show different alternative configurations of electromagnetic detection.

A basic arrangement is illustrated in FIG. 3a, a pouring nozzle 50 being schematically shown from above as a circle. On one side of the pouring nozzle 50, a transmitting coil 52 is arranged to generate an electromagnetic field. Adjacent to the transmitting coil 52, a first receiving coil 54 is arranged to sense the electromagnetic field which the transmitting coil 52 generates. On the other side of the pouring nozzle 50, a second receiving coil 56 is arranged which also is arranged to sense said electromagnetic field. However, due to its location, the pouring nozzle 50 with its contents, such as liquid metal, will partly screen the transmitting coil 52. The second receiving coil 56 will therefore detect a weaker field than the first receiving coil 54. By reverse coupling or subtracting the signals from the receiving coils 54, 56, the basic signal which may contain interference is eliminated. Consequently, essentially only the signal affected by the type of flow in the pouring nozzle 50 is measured.

FIG. 3b shows an alternative configuration, in which the transmitting coil 52 is arranged to generate an electromagnetic field and four receiving coils 54, 56, 58, 60 are arranged to receive the field. Two of the receiving coils 54, 58 are arranged adjacent to the transmitting coil 52 and are not screened by the contents of the pouring nozzle 50. The other two receiving coils 56, 60 are arranged on the other side of the pouring nozzle 50, of which one receiving coil 56 is arranged diagonally to the transmitting coil 52, whereas the second receiving coil 60 is arranged displaced to the right in the figure. If it is particularly interesting to perform measurements on one side of the pouring nozzle 50, this is thus an advantageous arrangement. The transmitting coil 52 can generate electromagnetic fields having different frequencies, for example, by being fed with several frequencies or by scanning several frequency bands, the receiving coils being tuned in pairs (such as 54–56 and 58–60, respectively) to the respective frequencies so that the fields detected by the receiving coils can be easily distinguished.

In FIG. 3c yet another receiving coil 62 which is arranged adjacent to the transmitting coil 52 and a screened receiving coil 64 have been added. This further screened receiver is displaced to the left in the figure relative to the other screened receiving coils 56, 60, the arrangement of which corresponds to that in FIG. 3b. By way of the arrangement in FIG. 3c, a more complete picture of the flow section through the pouring nozzle 50 is thus obtained. Alternatively, the three screened receiving coils 56, 60, 64 can be replaced by one single receiving coil that scans or moves in an essentially partly circular path round the pouring nozzle 50.

In order to obtain an even more complete picture of the flow, further receiving coils can be arranged. For example, FIG. 3d shows five receiving coils 54, 58, 62, 66, 70 which are arranged adjacent to the transmitting coil 52 and five receiving coils 56, 60, 64, 68, 72 which are screened by the contents of the pouring nozzle 50.

Instead of using only one transmitting coil, it is possible to use several transmitting coils as shown in FIG. 3e. The figure shows three transmitting coils 80, 82, 84. Each transmitting coil generates an electromagnetic field, preferably with a frequency that is different from the frequencies with which the other two transmitting coils generate the fields. Six receiving coils are included in this arrangement, of which three receiving coils 86, 88, 90 are screened by the contents of the pouring nozzle 50 and three receiving coils 92, 94, 96 are not screened. Each transmitting coil 80, 82, 84 thus has a respective receiving coil 92, 94 and 96, respectively, arranged adjacent to itself and a receiving coil 86, 88 and 90, respectively, on the diametrically opposed side of the pouring nozzle 50, these two receiving coils being tuned to the frequency band that precisely the specific transmitting coil uses.

FIG. 3f shows yet another configuration. In this configuration, a transmitting coil 100, two non-screened receiving coils 102, 104 and a screened receiving coil 106 are used. The two non-screened receiving coils 102, 104 are reverse coupled to the screened receiving coil 106.

Although all the arrangements shown in FIGS. 3a–3f comprise reverse coupled receiving coils, those skilled in the art will realise that if an acceptable signal is obtained also without reverse coupling, the non-screened receiving coils can be left out.

Figure 4:
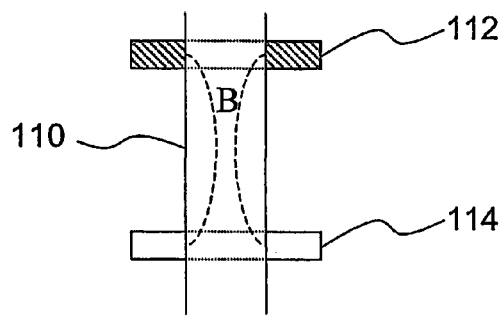
FIG. 4 shows yet another alternative configuration of electromagnetic detection.

FIG. 4 shows yet another alternative configuration as regards electromagnetic detection. This figure shows a longitudinal cross-section through a pouring nozzle portion 110. A transmitting coil 112 is arranged round the pouring nozzle 110 and, in a corresponding manner, a receiving coil 114 which is placed below the transmitting coil is arranged round the pouring nozzle 110. An electromagnetic field B, which is generated by the transmitting coil 112, propagates inside the pouring nozzle 110 and is attenuated by the contents before the field is detected by the receiving coil 114. As in FIGS. 3a–3f it is possible to include a receiving coil which detects the electromagnetic field without influence from the contents of the pouring nozzle in order to obtain a more distinct output signal. According to the arrangement in FIG. 4, the measurement is thus performed in vertical layers unlike the arrangements shown in FIGS. 3a–3f, in which measurement is performed through the pouring nozzle in horizontal layers.

Figure 5:
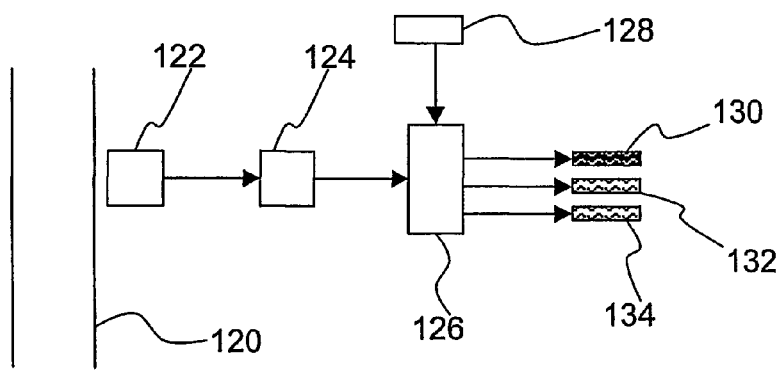
FIG. 5 shows an exemplifying block diagram of the measurement and control of the gas and metal contents in a flow in a pouring nozzle.

FIG. 5 shows an exemplifying block diagram of the measurement and the control of the gas and metal contents in a flow in a pouring nozzle 120. The block diagram thus shows a sensor 122 which preferably is of the type electromagnetic sensor, acoustic sensor, such as ultrasonic sensor, vibration sensor, radiac dosimeter, such as X-ray or gamma gauge, temperature sensor, pressure sensor or speedometer, or a combination thereof. The sensor 122 passes on a flow-related measuring signal to an evaluation unit 124 which converts the measuring signal to interpretable actual values. These actual values are fed to a control unit 126 which compares the actual values with the desired values which are indicated by a user or a user unit 128 and which have been derived empirically or by calculations. Subsequently, the control unit 126 controls flow-affecting parameters based on the result of the comparison in such a manner that the desired type of flow is provided for the layer where the measurement has been performed. The block diagram shows this as a metal-flow-affecting unit 130 and two gas-flow-affecting units 132, 134. The two gas-flow-affecting units can, for instance, comprise a gas outlet which is adapted to eject gas at the walls of the pouring nozzle and, respectively, a gas outlet which is adapted to eject gas centrally above the pouring nozzle.

The signal processing does not in itself constitute part of the invention, but is of such type that those skilled in the art can take the appropriate measures. For this reason, the signal processing has not been described in detail and has only been illustrated schematically in the example above.

FIGS. 6a–6c and FIGS. 6a'–6c' very schematically illustrate different types of flow for a gas-containing flow of metal inside a section of a tubular device 140. FIGS. 6a–6c show a longitudinal section of the tubular device and FIGS. 6a'–6c' show for the corresponding type of flow a cross-section of the tubular device. The metal is represented by dark portions and the gas is represented by light portions.

FIGS. 6a, 6a' illustrate a so-called bubbly flow, i.e. a gas 142 is diffused in liquid metal 144, essentially in bubbly form. FIGS. 6b, 6b' illustrate an annular centred flow, i.e. an essentially continuous metal jet 144 is annularly surrounded by the gas 142. FIGS. 6c, 6c' illustrate an annular non-centred flow, i.e. the metal flow 144 essentially follows the walls of the tubular device 140 and surrounds a gas jet 142 which flows in the centre of the tubular device 140.

Figure 6:
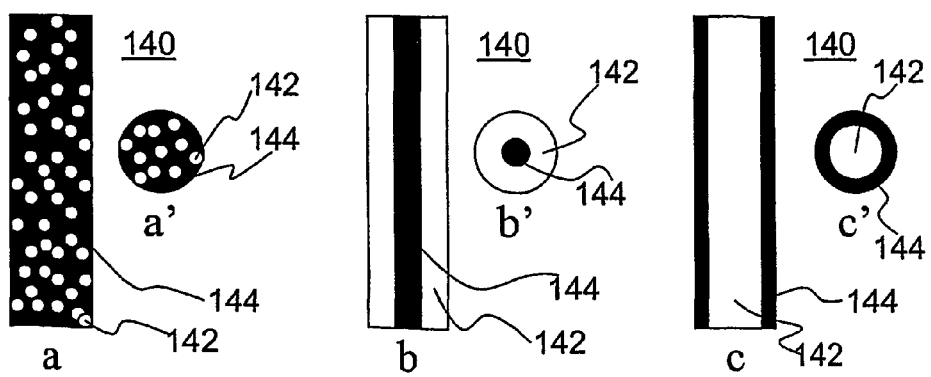
FIGS. 6a–6c and FIGS. 6a'–6c' illustrate different types of flow for a gas-containing metal flow inside a tubular device.
Figure 7:
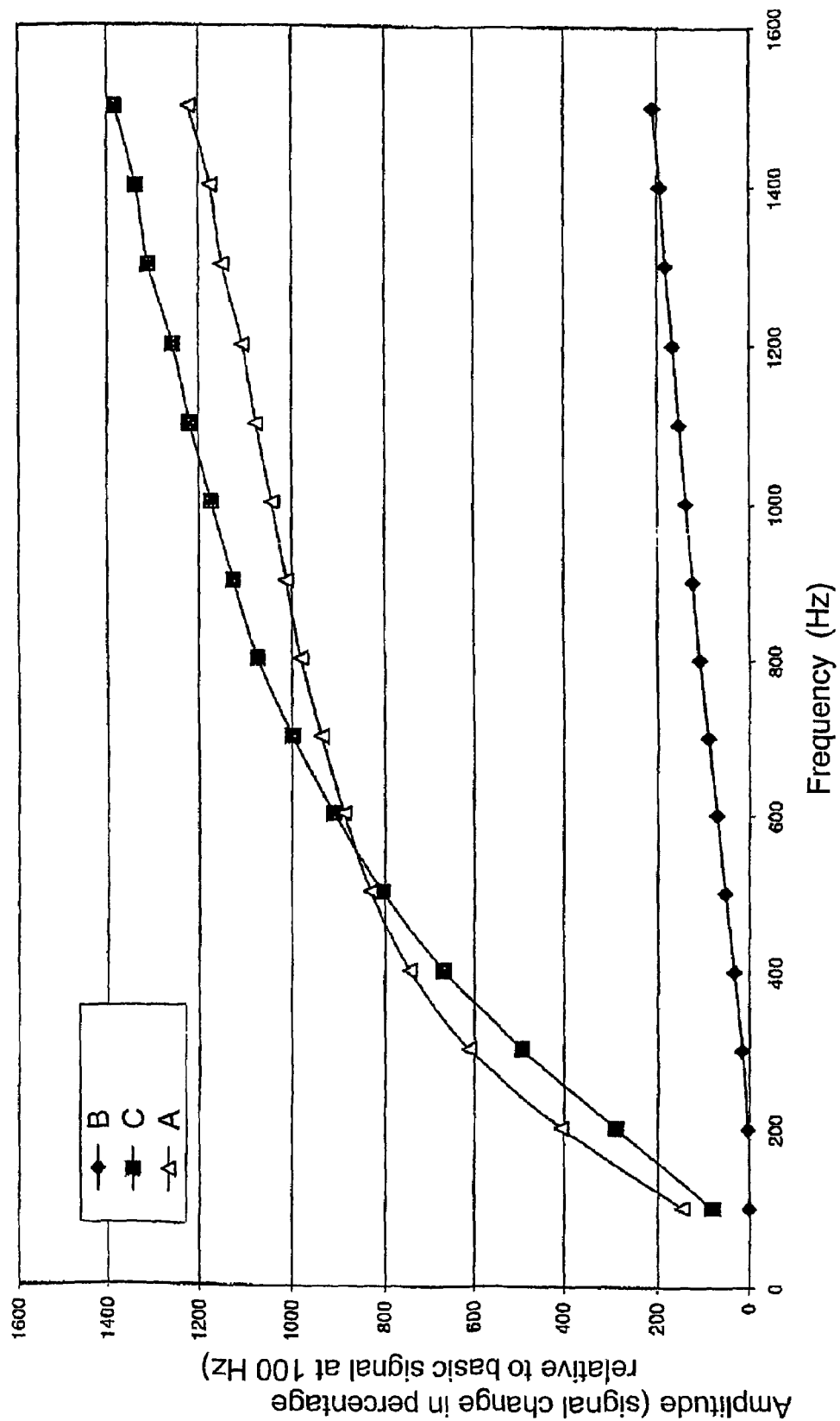
FIG. 7 shows a diagram of how the influence of the types of flow shown in FIG. 6 on an electromagnetic field varies with the frequency of the generated field.

FIG. 7 shows a diagram of how the influence of the types of flow shown in FIG. 6 on an electromagnetic field varies with the frequency of the generated field. The diagram shows three graphs, graph A illustrating a bubbly flow, graph B illustrating an annular centred flow and graph C illustrating an annular non-centred flow. The diagram shows how, depending on the frequency, a metal and gas flow in a tubular device affects the electromagnetic field which a receiving device detects and gives information about in the form of an output signal. The output signal is shown in the diagram as a signal change in percentage relative to a basic signal at 100 Hz. In this case, basic signal implies that the tubular device is empty, i.e. without any metal therein.

Apparently, it is easy to distinguish the graph B (annular centred flow) from the two other ones. This depends on the fact that the metal jet in such a centred flow only gives a small cross-section for the magnetic field to penetrate and therefore this gives only a small signal change compared with the basic signal. The graphs A and C are similar to one another. In both cases, the tubular device contains a large metal cross-section, resulting in a considerable screening of the magnetic field, which leads to great signal changes. Although these two graphs are similar to one another, they exhibit considerable differences. For example, they intersect at about 550 Hz, after which graph C goes higher than graph A. This depends on the bubbles in a bubbly flow (graph A) giving better penetration for the magnetic field at higher frequencies than does a homogeneous material free from gas.

Although some preferred embodiments have been described above, the invention is not limited to them. Consequently, it should be understood that a number of modifications and variations can be carried out without deviating from the scope of the present invention defined in the appended claims.

The invention claimed is:

1. A method for controlling a gas-containing flow of molten metal in a space defined by a tubular device, comprising the steps of:
   measuring, for at least one predetermined layer of the metal flow in the space, at least one quantity which is representative of at least one flow factor in said layer of said gas-containing flow of molten metal;
   obtaining values from the measured quantity that give an indication of the appearance of the flow in said layer by comparing with stored values; and
   controlling, based on the result of the comparison, at least one flow-affecting parameter so that a type of flow of a desired appearance is produced at least in said layer.

2. A method as claimed in claim 1, wherein said desired type of flow includes at least one of the following:
   a bubbly flow, the gas being diffused in the metal flow,
   a centred flow of molten metal, the gas essentially surrounding the metal flow,
   an annular non-centred flow of molten metal, the metal flow essentially surrounding the centred gas.

3. A method as claimed in claim 1, wherein said flow factor comprises the metal contents in said layer.

4. A method as claimed in claim 1, wherein said flow factor comprises the gas contents in said layer.

5. A method as claimed in claim 1, wherein the step of measuring said quantity comprises measuring in a layer in the transverse direction of the flow in order to obtain an indication of the distribution of the metal and the gas over said layer of flow.

6. A method as claimed in claim 5, wherein measurements are performed in several layers, and based on the measurements performed an indication is obtained of the appearance of the flow in the respective layers by comparing with the stored values, at least one flow-affecting parameter being controlled based on the result of the different comparisons so that a desired type of flow is provided for each layer, at least one of the same type of flow and a combination of different types of flow being provided in the space.

7. A method as claimed in claim 1, wherein said at least one parameter comprises at least one of a direct and indirect supply of gas to the space.

8. A method as claimed in claim 7, wherein the gas is supplied upstream of the metal flow in the tubular device.

9. A method as claimed in claim 7, wherein gas is supplied directly to the defined space and the metal flow flowing therein.

10. A method as claimed in claim 7, wherein gas is supplied indirectly to the defined space and the metal flow flowing therein.

11. A method as claimed in claim 1, wherein the step of measuring said quantity is performed without contact relative to the gas and metal flow from at least one side of the defined space.

12. A method as claimed in claim 1, wherein the step of measuring said quantity is performed continuously, control of said at least one flow-affecting parameter being carried out, if required.

13. A method as claimed in claim 1, wherein measurements are performed on a metal flow in a pouring nozzle, the measurements of said quantity being performed at least at one end portion of the pouring nozzle.

14. A method as claimed in claim 1, wherein the step of measuring said quantity is performed by way of electromagnetic measurements, said quantity being related to the strength of an electromagnetic field.

15. A method as claimed in claim 14, wherein the step of measuring said quantity comprises:
   generating an electromagnetic field next to the defined space and said layer, and
   detecting said electromagnetic field affected by the metal and gas contents in said layer, in a position where the defined space with its contents at least partly screens the generated field; and wherein the step of determining the actual type of flow comprises,
   determining a value, which indicates a predetermined type of flow, based on the detected electromagnetic field.

16. A method as claimed in claim 14, wherein the step of measuring said quantity comprises:
   generating an electromagnetic field next to the defined space and said layer,
   detecting said electromagnetic field affected by the metal and gas contents in said layer, in a position where the defined space with its contents at least partly screens the generated field, and
   detecting said electromagnetic field essentially without influence from the metal and gas contents in the defined space; and wherein the step of determining the actual type of flow comprises,
   calculating the difference in power of the two detected fields for determination of a value which indicates a predetermined type of flow.

17. A method as claimed in claim 15, wherein said screened position is diametrically opposed to the side from which said field is generated.

18. A method as claimed in claim 15, wherein said screened position is non-diametrically arranged relative to the side of the space from which said field is generated.

19. A method as claimed in claim 1, wherein said at least one parameter comprises supply of metal to the defined space.

20. A method as claimed in claim 1, wherein detection is made for detecting accumulation of at least one of deposit on and clogging of a pouring nozzle with at least one of inclusions and slag entrained by the metal, and wherein measures are taken in order to counteract the accumulation of at least one of deposit and clogging.

21. The method of claim 1, wherein the method is for controlling a gas-containing a flow of molten metal in a space inside a pouring nozzle, wherein the step of obtaining values includes obtaining values from the measured quantity that give an indication of the appearance of the flow in said layer by comparing with empirically determined values, and wherein the step of controlling includes controlling, based on the result of the comparison, at least one flow-affecting parameter including at least one of gas supply and metal supply, so that a type of flow of a desired appearance is produced at least in said layer.

22. A method as claimed in claim 2, wherein said flow factor comprises the metal contents in said layer.

23. A method as claimed in claim 1, wherein said at least one parameter comprises at least one of a direct and indirect supply of gas to the space with respect to at least one of volume, pressure, direction and position.

24. A method as claimed in claim 7, wherein gas is supplied directly to the defined space and the metal flow flowing therein.

25. A method as claimed in claim 7, wherein gas is supplied indirectly to the defined space and the metal flow flowing therein, before the beginning of the space.

26. A method as claimed in claim 1, wherein said at least one parameter comprises supply of metal to the defined space, with respect to at least one of volume and direction.

27. A system for controlling a gas-containing flow of molten metal in a space defined by a tubular device, comprising:
 a detection device, adapted to be arranged adjacent to the tubular device to measure, for at least one predetermined layer in the space, at least one quantity which is representative of at least one flow factor in said layer of said gas-containing flow of molten metal;
 an evaluation device, coupled to the detection device, for receiving values obtained from the measured quantity and which give an indication of the appearance of the flow in said layer by comparing with stored values; and
 a control device, coupled to the evaluation device and adapted to control, from the result of the comparison, at least one flow-affecting parameter so that a type of flow of a desired appearance is produced at least in said layer.

28. A system as claimed in claim 27, wherein said desired type of flow includes at least one of the following:
 a bubbly flow, the gas being diffused in the metal flow,
 a centred flow of molten metal, the gas essentially surrounding the metal flow, and
 an annular non-centred flow of molten metal, the metal flow essentially surrounding the centred gas.

29. A system as claimed in claim 27, wherein said flow factor comprises the metal contents in said layer.

30. A system as claimed in claim 27, wherein said flow factor comprises the gas contents in said layer.

31. A system as claimed in claim 27, wherein the detection device comprises a first set of means for measuring in a first layer transversely to the flow in order to obtain an indication of the distribution of the metal and the gas over said layer of flow.

32. A system as claimed in claim 31, wherein the detection device also comprises a second set of means for measuring in a second layer, the evaluation device being adapted to obtain from the performed measurements an indication of the appearance of the flow in the respective layers by comparing with stored values, the control device controlling from the result of the different comparisons at least one flow-affecting parameter in such a manner that a desired type of flow is provided for the respective layers, wherein at least one of the same type of flow and a combination of different types of flow being provided in the space.

33. A system as claimed in claim 27, wherein means for controlling the supply of metal to the space are arranged upstream of the space and controlled by the control device.

34. A system as claimed in claim 27, wherein means for controlling the supply of gas to the space with respect to at least one of volume, pressure, direction and position, are arranged upstream of the space, the means being controlled by the control device.

35. A system as claimed in claim 34, wherein said means for controlling are arranged in direct connection with the space and the metal flow flowing therein.

36. A system as claimed in claim 34, wherein said means for controlling are arranged in indirect connection with the space and the metal flow flowing therein.

37. A system as claimed in claim 27, wherein the detection device comprises at least one electromagnetic transmitter and receiver, said quantity being related to the strength of an electromagnetic field.

38. A system as claimed in claim 37, wherein the detection device comprises:
 first means for generating an electromagnetic field next to the defined space and said layer, and
 second means, arranged in a position where the defined space with its contents at least partly screens the generated field, for detection of said electromagnetic field affected by the metal and gas contents in said layer; and wherein the evaluation device comprises,
 means for determining, from the detected electromagnetic field, a value which indicates a predetermined type of flow.

39. A system as claimed in claim 37, wherein the detection device comprises:
 first means, arranged next to the defined space and said layer, for generation of an electromagnetic field;
 second means, arranged in a position where the defined space with its contents at least partly screens the generated field, for the detection of said electromagnetic field affected by the metal and gas contents in said layer; and
 third means for detecting said electromagnetic field without any influence from the metal and gas contents in the defined space, and wherein the evaluation device comprises,
 means for calculating the difference in strength of the two detected fields in order to determine a value that indicates a predetermined type of flow.

40. A system as claimed in claim 38, wherein said second means are arranged diametrically opposed to the side on which said first means are arranged.

41. A system as claimed in claim 38, wherein said second means are non-diametrically arranged relative to the side of the space on which said first means are arranged.

42. A system as claimed in claim 37, wherein each of said electromagnetic transmitters and receivers is arranged around the tubular device, and wherein said electromagnetic transmitters and receivers are arranged at different locations along the tubular device.

43. The system as claimed in claim 27, wherein the system is used for detecting accumulation of at least one of deposit on and clogging of a pouring nozzle with at least one of inclusions and slag entrained by the metal and for taking measures that counteract the accumulation of at least one of deposit and clogging.

44. The system as claimed in claim 27, wherein the system is for controlling a gas-containing flow of molten metal in a space defined by inside a pouring nozzle;

wherein the evaluation device, coupled to the detection device, is for receiving values obtained from the measured quantity and which give an indication of the appearance of the flow in said layer by comparing with empirically determined values; and wherein the control device is adapted to control, from the result of the comparison, at least one flow-affecting parameter including at least one of gas supply and metal supply, so that a type of flow of a desired appearance is produced at least in said layer.

45. A system as claimed in claim 27, wherein means for controlling the supply of metal to the space with respect to at least one of volume and direction, are arranged upstream of the space and controlled by the control device.

* * * * *